(12) United States Patent
Zeysing et al.

(10) Patent No.: US 8,742,002 B2
(45) Date of Patent: Jun. 3, 2014

(54) RELEASE COATING WITH LOW FRICTION COEFFICIENT

(75) Inventors: Björn Zeysing, Hamburg (DE);
Alexander Herrmann, Hamburg (DE);
Andreas Wieck, Halstenbek (DE);
Patrick Böcker, Hamburg (DE)

(73) Assignee: tesa SE, Hamburg (DE)

( * ) Notice: Subject to any disclaimer, the term of this patent is extended or adjusted under 35 U.S.C. 154(b) by 70 days.

(21) Appl. No.: 13/485,331

(22) Filed: May 31, 2012

(65) Prior Publication Data

US 2012/0322937 A1    Dec. 20, 2012

(30) Foreign Application Priority Data

Jun. 17, 2011 (DE) .......... 10 2011 077 700

(51) Int. Cl.
*C08L 83/00* (2006.01)
*C08G 18/62* (2006.01)
*C08F 118/02* (2006.01)
*C08F 120/18* (2006.01)

(52) U.S. Cl.
USPC ......... 524/506; 524/197; 526/319; 526/329.7

(58) Field of Classification Search
USPC .................. 524/198, 506, 19; 526/319, 329.7
See application file for complete search history.

(56) References Cited

U.S. PATENT DOCUMENTS

| | | | |
|---|---|---|---|
| 4,576,999 A | 3/1986 | Eckberg | |
| 4,678,846 A | 7/1987 | Weitemeyer et al. | |
| 4,725,630 A | 2/1988 | Magee et al. | |
| 4,978,726 A | 12/1990 | Döhler et al. | |
| 5,376,420 A * | 12/1994 | Yamamoto et al. | 428/41.4 |
| 5,620,775 A | 4/1997 | LaPerre | |
| 7,198,854 B2 | 4/2007 | Dumont et al. | |
| 2005/0003216 A1 * | 1/2005 | Frances et al. | 428/447 |

FOREIGN PATENT DOCUMENTS

| | | |
|---|---|---|
| DE | 3316166 A1 | 11/1983 |
| DE | 3820294 C1 | 10/1989 |
| EP | 0168713 B1 | 1/1986 |
| EP | 0523527 A2 | 1/1993 |
| EP | 0903385 A1 | 3/1999 |
| WO | WO 2008005228 A2 | 1/2008 |
| WO | WO 2010067111 A2 | 6/2010 |

OTHER PUBLICATIONS

European Search Report for corresponding European Application EP 12170649.3 mailed Sep. 19, 2012.

* cited by examiner

*Primary Examiner* — Michael M Bernshteyn
(74) *Attorney, Agent, or Firm* — Norris McLaughlin & Marcus, P.A.

(57) ABSTRACT

A composition of a release coating, for furnishing a release liner with a layer of the release coating, has a release agent and 0.01% by weight to 30% by weight (based on the overall composition) of a finely particulate additive in the form of three-dimensional bodies based on polymers prepared from vinyl building blocks.

16 Claims, No Drawings

RELEASE COATING WITH LOW FRICTION COEFFICIENT

The invention relates to a composition for release coatings which have a low coefficient of friction.

At the end of the production process, adhesive tapes, coated on one or both sides with adhesives, are usually wound up into a roll in the form of an Archimedean spiral. In order to prevent the pressure-sensitive adhesives coming into contact with one another in the case of double-sided adhesive tapes, or in order to ensure greater ease of unwind in the case of single-sided adhesive tapes, the adhesive is covered with a liner material (also referred to as release material) before the adhesive tape is wound up. Liner materials of this kind are known to the skilled person as release liners or liners. In addition to the lining of single-sided or double-sided adhesive tapes, liners are also used for lining labels.

Another function of these release liners is to protect the adhesive from contamination prior to use. Furthermore, via the nature and composition of the release materials, release liners can be tailored so that the adhesive tape can be unwound with the desired force (lightly or heavily). In the case of adhesive tapes coated with adhesive on both sides, the release liners have the additional function of first exposing the correct side of the adhesive on unwind.

A liner, or release liner, is not part of an adhesive tape or label, both only an aid to its production, storage or further processing by diecutting. Moreover, in contrast to the carrier of an adhesive tape, a liner is not joined firmly to a layer of adhesive.

Release liners used industrially are paper or film backings which are furnished with an abhesive coating material (also called a dehesive or anti-adhesive material) in order to reduce the tendency of adhering products to adhere to these surfaces (active release function). As materials of this kind, also referred to as release material, there are a multiplicity of different substances that can be used: waxes, fluorinated or partly fluorinated compounds, and especially silicones, and also various copolymers with silicone components. In recent years, silicones have become extensively established as release materials in the area of adhesive tape application, by virtue of their good processing properties, low costs and broad profile of properties.

A range of adhesive tapes coated on both sides with adhesive are unwound and further applied with the release liner which is present in the product and which lines the second adhesive. In the case of manual application, the adhesive of the adhesive tape is brought into contact with the substrate by running a hand over the release liner. This form of application, carried out with an applied pressure, entails strong contact between the release liner of the product and the hand. As a result of the release material used, the release liners employed predominantly have a blunt surface with a high coefficient of friction. In this case, application of the product is unpleasant or even painful, especially when carried out frequently and/or at high speed.

It is known that the coefficient of friction of silicone release coatings can be reduced by various methods, all of which, however, have certain disadvantages.

Unmodified silicone systems, of the kind formed by crosslinking of functionalized siloxanes, have very good release properties, but a high coefficient of friction. When silicone condensation systems are used instead of the silicone addition systems that are predominantly employed industrially, the coefficient of friction is somewhat lower. However, the condensation systems almost exclusively use toxic tin catalysts.

The skilled worker is aware that the friction can be lowered by reducing the layer thickness of the release system. At the same time, however, this leads to an often unwanted deterioration in the release properties. The coefficient of friction of release systems can also be lowered by addition of oils or substances which expand the structures formed on crosslinking of the release system. This, however, results in an increase in the proportion of migratable substances within the release system. These substances may deposit on an adhesive which is contact with the release system, and thereby lower its bond strength.

EP 0 903 385 B1 describes the reduction in the friction of radiation-crosslinking silicone systems through the addition of spherical silicone particles prepared by controlled hydrolysis of methyltrimethoxysilane. The expensive and inflexible production process prevents the use of porous or hollow additives, such use being particularly advantageous in one aspect of that invention.

U.S. Pat. No. 7,198,854 B describes silicone formulations for the treatment of textile materials for the purpose of reducing friction and producing a shiny appearance. This effect is generated for the addition of a mixture of nylon and particles of silica. The use of silica particles results in an increase in release forces that is undesirable in the adhesive tape sector.

U.S. Pat. No. 5,620,775 A describes articles whose coating contains 20 to 180 μm diameter glass beads in order to enhance the reflectivity and friction and in order to generate a hydrophilic surface.

While 20 μm diameter beads are much too large for application in release films and release papers, the generation of hydrophilic surfaces would result in a marked deterioration in the release characteristics of adhesives.

It is an object of the present invention to produce release layers which combine a low coefficient of friction with stable, low release values and which, for application in the adhesive tape sector, do not exhibit any reduction in bond strength through transfer of certain components of the release coating to the adhesive after contact. The release layers produced in accordance with the invention are to be toxicologically objectionable and readily manageable from a process engineering standpoint. Generally speaking, the present invention aims to overcome the disadvantages of the prior art.

This object is achieved by a composition of a release coating as is recorded in the main claim. The dependent claims provide advantageous developments of the subject matter of the invention. The invention additionally embraces the use of this composition.

The invention accordingly relates to a composition of a release coating, intended more particularly for furnishing a release liner with a layer of the release coating, comprising:
  a release agent and
  0.01% by weight to 30% by weight, preferably 0.1% to 10% by weight, more preferably 0.3% to 5% by weight (based in each case on the overall composition) of a pulverulent additive in the form of three-dimensional bodies based on polymers prepared from vinyl building blocks.

Polymers prepared from vinyl building blocks are, in accordance with the invention, polymers prepared by polymerization of a carbon-carbon double bond. Examples include polyethylene, polypropylene, polyacrylates and polymethacrylates, more particularly polymethyl methacrylates.

In accordance with one first advantageous embodiment of the invention, the release coating consists only of the release agent and the additive.

In the sense of the invention, a three-dimensional body means a three-dimensional restricted geometric form which can be described by boundary faces. A geometric form is said to be three-dimensional when it is not contained completely in any one plane, and restricted when there is a sphere which completely contains this form.

The best-known bodies possess flat or circular or spherical boundary faces. Examples are cylinder, cones, spheres, prisms, pyramids, tetrahedra, cubes, and also the five regular polyhedra. When a body is restricted exclusively by planar faces, it is referred to as a polytope or as a restricted polyhedron (multi-faceted body).

The bodies used in accordance with the invention may accordingly have, among others, the following forms:
  Parallelepiped, with cuboid and hexahedron (cube) as special instances
  Prisms, with the cylinder as a generalization and with cuboid and hexahedron as special instances
  Pyramids, with the cone as a generalization and tetrahedron as a special instance
  Antiprisms, with octahedron as a special instance.

Preferred in accordance with the invention are ellipsoids, more preferably rotational ellipsoids and very preferably spheres.

The bodies, including more particularly those recited above, as for example a cube, preferably have no corners or sharp edges. For this purpose, the corners or edges actually present may be, or may have been, rounded off.

In accordance with another advantageous embodiment of the invention, the length of the diameter of the major axis of the bodies (major diameter) is 0.01 μm to 10 μm, preferably 0.1 μm to 8 μm and more preferably 1 μm to 4 μm.

The major diameter of the body here is considered to be the diameter having the greatest length.

With further preference, the length of the minor diameter differs by not more than 20%, preferably 10%, from the length of the major diameter.

The minor diameter of the body here is considered to be the diameter with the smallest length.

In the case of an ideal sphere or in the case of a cube, the lengths of major diameter and minor diameter are identical.

Normally the bodies are of solid material. Advantageously, however the bodies are hollow and/or porous.

In one specific aspect of the invention it is advantageous to use porous bodies, since this allows a backing coated with the release coating to be written on or printed. Moreover, the use of porous or hollow bodies leads to layers having a particularly pleasant sensation to the skin, in other words a particularly low coefficient of friction.

With further preference the bodies consist of PMMA (polymethyl methacrylate) or mixtures of PMMA.

One especially advantageous embodiment of the invention comprises, as the additive, spheres of PMMA having a major diameter of 1 μm to 4 μm. In the absence of an ideal spherical form, the minor diameter of the spheres deviates by not more than 5% from the major diameter of the body.

As release agents it is possible to use all of the systems that are known to the skilled person.

The release agent is preferably selected from the group consisting of silicone, fluorinated silicone, silicone copolymers, waxes, carbamates or mixtures of two or more of the stated substances.

The release agent may comprise solvent-containing and/or solvent-free systems, with solvent-free systems being preferred.

The release agent may be radiation-crosslinking (UV or electron beam), condensation- or addition-crosslinking; preferably it is addition-crosslinking.

Release agents used are preferably crosslinkable silicone systems. These include mixtures of crosslinking catalysts and so-called thermally curable condensation-crosslinking or addition-crosslinking polysiloxanes. For condensation-crosslinking silicone systems, crosslinking catalysts present in the composition are frequently tin compounds such as dibutyl tin diacetate.

Silicone-based release agents based on addition-crosslinking can be cured by hydrosilylation. These release agents typically comprise the following constituents:
  an alkenylated polydiorganosiloxane (in particular, linear polymers with terminal alkenyl groups),
  a polyorganohydrosiloxane crosslinking agent, and
  a hydrosilylation catalyst.

Catalysts which have become established for addition-crosslinking silicone systems (hydrosilylation catalysts) are, for example, platinum or compounds of platinum, such as the Karstedt catalyst (a Pt(0) complex compound), for example.

In addition it is also possible to use photoactive catalysts, known as photoinitiators, in combination with UV-curable, cationically crosslinking siloxanes on an epoxide and/or vinyl ether basis, and/or UV-curable, radically crosslinking siloxanes such as, for instance, acrylate-modified siloxanes. The use of electron beam-curable silicone acrylates is possible as well. Depending on their intended use, such systems may also include further additions such as stabilizers or flow control assistants.

Photopolymerizable organopolysiloxane compositions can be used as well. Examples include compositions which are crosslinked through the reaction between organopolysiloxanes which have hydrocarbon radicals substituted by (meth)acrylate groups attached directly to the silicon atoms, and in the presence of a photosensitizer (see EP 0 168 713 B1 or DE 38 20 294 C1). Likewise suitable for use are compositions in which the crosslinking reaction between organopolysiloxanes which have mercapto-group-substituted hydrocarbon attached directly to the silicon atoms, and organopolysiloxanes having vinyl groups attached directly to the silicon atoms, is induced in the presence of a photosensitizer. Compositions of these kinds are described in U.S. Pat. No. 4,725,630 A1, for example.

When using the organopolysiloxane compositions—described in DE 33 16 166 C1, for example—that have epoxy-group-substituted hydrocarbon radicals attached directly to the silicon atoms, the crosslinking reaction is induced by the release of a catalytic amount of acid obtained by photodecomposition of added onium salt catalysts. Other organopolysiloxane compositions which can be cured by a cationic mechanism are materials which have, for example, propenyloxysiloxane end groups.

Additionally it is possible for fluorinated silicones and/or silicone copolymers to be used.

In accordance with one particularly advantageous embodiment of the invention, the composition of the release coating is as follows:
  The release agent used is an addition-crosslinking silicone system consisting of a vinyl-functionalized polysiloxane as base polymer, a methylhydrosiloxane as crosslinker, and a platinum catalyst—in a fraction of 92.5% to 99.5% by weight.
  Added as an additive to this release agent are spheres of PMMA having a major diameter of 1 μm to 4 μm—in a fraction of 0.5% to 7.5% by weight. Here again, in the absence of an ideal spherical form, the minor diameter of the spheres differs by not more than 10% from the major diameter of the body. The mixture is homogenized completely.

The invention further provides for the use of such release coatings in the form of at least one layer on a backing, to give a release liner which can be used in direct contacting with a (pressure-sensitive) adhesive. For this purpose the coating is applied, preferably as a continuous layer, to a release liner. The release liner is preferably furnished on both sides with the release coating.

The silicones are applied—solventlessly or from solution—to the backing, it being possible to use all of the coating methods that are familiar to the skilled person, and where necessary are dried thereon (the solvent is removed), to form, subsequently, a preferably continuous silicone coating.

The release coating is applied preferably with a layer thickness of 0.1 to 5.0 μm, more preferably of 0.2 to 2.5 μm, very preferably of 0.4 to 2.0 μm.

Backing material used for the liner may be, in particular, papers or films. Films in this case are preferably those of biaxially oriented polyethylene terephthalate, polybutene, polypropylene, polyethylene, monoaxially oriented polypropylene, biaxially oriented polypropylene or polyethylene, with particular preference polyolefin films (polypropylene and polyethylene films) or polyester films.

The invention relates, finally, to the use of the release coating of the invention—preferably silicone based—in an adhesive tape, preferably as at least one layer on a release liner with which a single-sided or double-sided adhesive tape is lined on one or both sides. Normally a single-sided adhesive tape is lined with a release liner on the adhesive side. In the case of a two-sided adhesive tape, one release liner may be sufficient, or else both adhesive sides may be furnished with one release liner each.

The adhesive present in the adhesive tape is a pressure-sensitive adhesive, thus producing a single-sided adhesive tape where the coating acts as a release agent.

Pressure-sensitive adhesives are adhesives which allow a permanent join to the substrate under just relatively weak applied pressure, and after use can be detached again from the substrate with substantially no residue. At room temperature, pressure-sensitive adhesives are permanently adhesive—that is, they have a sufficiently low viscosity and a high tack, and so they wet the surface of the bond substrate in question even when the applied pressure is low. The bondability of the adhesives derives from their adhesive properties, and the redetachability from their cohesive properties. A variety of compounds are contemplated as a basis for pressure-sensitive adhesives.

Examples of pressure-sensitive adhesives—though without wishing to impose any restriction—that may be cited as advantageous for the purposes of this invention are as follows; acrylate, silicone, natural rubber, synthetic rubber and styrene block copolymer compositions, with an elastomer block composed of unsaturated or hydrogenated polydiene blocks (polybutadiene, polyisoprene, copolymers of both, and other elastomer blocks familiar to the skilled person) and also further pressure-sensitive adhesives, familiar to the skilled worker, for which silicone-based release coatings in particular can be used. Where reference is made in the context of this specification to acrylate-based pressure-sensitive adhesives, this should be taken, in the absence of any explicit statement, to include pressure-sensitive adhesives based on methacrylates and based on acrylates and methacrylates unless expressly described otherwise. Likewise in the context of the invention are combinations and blends of two or more base polymers, and also adhesives additized with tackifier resins, fillers, ageing inhibitors and crosslinkers, the recitation of the additives being meant only by way of example and not of limitation.

The carrier or liner of the adhesive tape is coated on one side with the preferred pressure-sensitive adhesive from solution or dispersion or in 100% form (melt, for example) or by coextrusion. An alternative option is that of coating by transfer of a layer of adhesive, by lamination. The adhesive layer or layers may be crosslinked by heat or energetic beams.

For the purpose of optimizing the properties it is possible with preference for the self-adhesive composition employed to be blended with one or more additives such as tackifiers (resins), plasticizers, fillers, pigments, UV absorbers, light stabilizers, ageing inhibitors, crosslinking agents, crosslinking promoters or elastomers.

The amount of the layer of adhesive is preferably 10 to 120 $g/m^2$, preferably 25 to 100 $g/m^2$ (this referring to the amount after any necessary removal of water or solvent; the numerical values also correspond approximately to the thickness in μm).

It is advantageous to carry out physical pretreatment of the side of the carrier that is to be coated with pressure-sensitive adhesive in order to improve the adhesion, such treatment taking place for example by flame, plasma or corona methods.

As and when necessary, a primer layer can be applied before the layer of pressure-sensitive adhesive is applied to the carrier, such primer application taking place, more particularly, solventlessly, such as by coextrusion, for example, to give a primer layer located between the backing layer and a layer of pressure-sensitive adhesive.

Primers which can be used are the known dispersion-based and solvent systems, based for example on isoprene- or butadiene-containing rubbers and/or cyclorubbers. Isocyanates or epoxy resins as additives improve the adhesion and in some cases also increase the shear strength of the pressure-sensitive adhesive. Physical surface treatments such as flaming, corona or plasma or coextrusion layers, are likewise suitable for improving the adhesion. Particularly preferred is the utilization of the aforementioned methods when using solvent-free layers of adhesive, more particularly those based on acrylate.

Descriptions of the standard primers are found for example in "Handbook of Pressure Sensitive Adhesive Technology", D. Satas, (3rd edition).

With particular advantage the release liner is used in an adhesive tape which is used for joining webs of papers or or film.

Flat materials in web form, paper in particular, are wound up to form bales. Bales of this kind are supplied, for example, to paper-processing machines or to printing and/or packaging machines. In ongoing operation of such units, it is necessary to attach the start of a new, wound bale to the end of a first bale of the flat material in web form, and to join the start and end in a suitable way, in a switch made on the fly, without having to stop the high-speed machines for the switch of rolls. This operation is referred to as splicing.

For this purpose, within the paper industry, double-sided self-adhesive tapes are used which consist essentially of a backing layer and two layers of self-adhesive composition, in order to produce a bond between the end of the old material web and the start of the new material web. The end of the old material web is bonded in this case to the start of the new material web.

The general expression "adhesive tape" for the purposes of this invention encompasses all sheetlike structures such as to two-dimensionally extended sheets or sheet sections, tapes with extended length and limited width, tape sections, labels, diecuts and the like.

The additives of the invention produce a release coating composition which on a backing has a coefficient of friction which is significantly lower than that of the same system without the additives of the invention.

These additives reduce the friction of release layers while retaining the effective release properties relative to various adhesives.

Moreover, in the case of solvent-containing silicone release systems on backing films, the additives according to the invention reduce the bond strength depression of a pressure sensitive adhesive mass covered with the release system. At least in the range from 1 to 8 wt % a significant decrease of bond strength depression when increasing the fraction of the additives is observed. Therefore, a further subject matter of the invention is a release liner, which comprises a backing film and a solvent-containing release coating, wherein the release coating comprises a release agent which is selected from the group consisting of silicones, fluorinated silicones, silicone copolymers and mixtures of two or more of the mentioned substances, and 1 to 8 wt %, based on the total weight of the release coating, of a finely particulate additive in the form of three-dimensional bodies based on polymers prepared from vinyl building blocks.

All preferred embodiments of the invention applicable to the aforementioned release liner accordingly are considered as being preferred for the aforementioned release liner, too.

Especially preferably, the material of the backing film is selected from the group consisting of biaxially oriented polyethylene terephthalate, polybutene, polypropylene, polyethylene, monoaxially oriented polypropylene, biaxially oriented polypropylene and polyethylene; and the release layer comprises a addition-crosslinked silicone as release agent and 2 to 8 wt %, based on the total weight of the release coating, of the finely particulate additive according to the invention. Exceptionally preferably, the material of the backing film is monoaxially oriented polypropylene (MOPP).

"Solvent-containing release coating" or "solvent-containing silicone release system", respectively, means that the respective release system is applied as effectively solvent-containing system; however, after the usually thermally initiated crosslinking only traces of solvent are present at most in the release system. The skilled person, however, refers to a "solvent-containing system", thus indicating the specific properties of such solvent-based obtained release coating.

EXAMPLES

The invention is illustrated below by means of examples, without being limited thereto. Unless indicated otherwise, all fractions of components are given in each case based on their weight.

Production and Coating of the Release Systems

Release liners were produced on a glassine paper (Silca ind. 2S white SCO 90 g from Ahlström) by using a laboratory coating unit to apply the release system formulations indicated below, with and without additives. The coatweight was 1.5 g/cm$^2$, corresponding to a layer with a thickness of approximately 1.5 μm. After coating had taken place, the release systems were crosslinked in a forced-air oven at 160° C. for 30 seconds.

The liners produced in this way were investigated for their coefficient of friction, the release value of the test tapes Tesa® 7475 and Tesa® 7476, and also the coatweight and bond strength depression. The test tape Tesa® 7475 is a PVC backing 40 μm thick, coated at 95 g/m$^2$ with a resin-modified pressure-sensitive acrylate adhesive. The test tape Tesa® 7476 uses a coatweight of 130 g/m$^2$ of a pressure-sensitive natural rubber adhesive on a backing with a thickness of 160 g/m$^2$.

Measurement of Release Behaviour

The above-described release liners were bonded to two different adhesive tapes. For this purpose, strips of the test tapes Tesa® 7475 and Tesa® 7476, with a width of 20 mm and a length of 300 mm in each case, were adhered to the release liners. For each sample, three laminates of liner with test tape Tesa® 7475 and liner with test tape Tesa® 7476, in each case: were stored under pressure and at temperature for 24 hours. The storage temperature was 40° C. for the Tesa® 7476 test tape and 70° C. for the Tesa® 7475 test tape. The pressure in both cases was 4 N/cm2.

After subsequent storage of the samples for two hours in a controlled-climate measuring chamber at 23° C. and 50% relative humidity, the release behaviour was determined by means of a tensile test.

Measurement of Bond Strength Depression

In addition, possible transfer of silicone or of the various additives was evaluated by measuring the bond strength depression of the test tape Tesa® 7475. For this purpose, the bond strength of a new Tesa® 7475 test tape to a steel surface was measured by means of a tensile test.

Then a Tesa® 7475 test tape which had been stored beforehand with the liner under pressure and at temperature for 24 hours, for the measurement of the release behaviour, was likewise adhered to steel, and the bond strength was measured by means of a tensile test. The bond strength depression is calculated in accordance with the following formula:

$$\text{Bond strength} - \text{Depression} = \frac{(\text{Bond strength of fresh tape} - \text{Bond strength of tape in contact with liner})}{\text{Bond strength with fresh tape}} * 100\%$$

Measurement of Silicone Add-On

For silicone-based release systems, the add-on of the release system was determined by X-ray fluorescence analysis. For this purpose, the carrier coated with the release system under investigation is analysed using the Lab-X$^{3000}$ X-ray fluorescence analyser from Oxford, with an internal (polydimethylsiloxane) reference. Since with this method the thickness of the release layer is determined from the strength of the silicon signal, it must be borne in mind that certain of the additives used will make a contribution to the layer thickness measured, and others will not—depending on whether the additives themselves do or do not contain silicon.

Determination of Coefficient of Friction

For determining the coefficient of friction, or the question which lies behind it, namely that of whether the release system has a pleasant skin sensation under stroking, the samples coated with release system were evaluated in a direct comparison by five testers. The basis for the evaluation is the skin sensation on stroking the release-system-coated liner with the hand under moderately great pressure—in other words, in the customary methods known to the skilled person for the application of pressure-sensitive adhesives.

The evaluation scale goes from 1 to 10, with a higher number of points denoting a more pleasant skin sensation. Each tester is to score the sample with the most pleasant skin sensation as 10, and that with the least pleasant skin sensation as 1. All further samples are scored relative to these, in accordance with the particular skin sensation. For the purpose of evaluation, the average of the evaluations from the different testers was calculated.

Determining the Markability of Release Systems

To determine the markability of release materials, they are marked using a text marker (Edding 3000 RED, Permanent Marker). After a drying time of 10 seconds, the written mark is wiped with a tissue, with a gentle applied pressure. Depending on the extent to which the written mark runs on the release system or is removed by wiping, a score of 1 to 10 is awarded, with 1 denoting complete removal and 10 no running at all of the writing on the release system.

Example 1

Silicone System without Additives/with Additives

Silicone system A is an addition-crosslinking silicone system from Wacker. 9.75 g of DEH 915 (a polydimethylsiloxane functionalized with vinyl groups) were mixed with 0.33 g of V24 (a methylhydropolysiloxane) and 0.08 g of Kat OL (a platinum catalyst, also known under the name "Karstedt catalyst").

Silicone system B is an addition-crosslinkings silicone system from Momentive. 9.75 g of SL 6961 (a polydimethylsiloxane functionalized with vinyl groups) were mixed with 0.33 g of SL 4330 (a methylhydrogenpolysiloxane) and 0.8 g of SL 6210 (a platinum catalyst, also known under the name "Karstedt catalyst").

The silicone system A was admixed with different fractions of PMMA spheres (Covabead LH 70/3 from Sensient, spherical PMMA beads with a particle diameter (major diameter) of 3 μm), and the mixture was homogenized. All of the silicone formulations were coated onto glassine paper (Silca ind. 2S white SCO 90 g from Ahlström) with a silicone add on of 1.5 g/m$^2$, using a laboratory coating machine. The coated samples were crosslinked in an oven at 160° C. for 30 seconds. Subsequently the release values with the test tapes, and also the bond strength depression and friction characteristics of the specimens, were evaluated as described above.

The results are summarized in Table 1.

TABLE 1

Effect of inventive additives on release values and friction characteristics of release liners

| Silicone system | Additive | Rub-off | RV 7475 [cH/cm] | RV 7476 [cH/cm] | Bond strength depression [%] | Friction characteristics. |
|---|---|---|---|---|---|---|
| A | none | 1 | 8 | 14 | −1% | 2 |
| B | none | 2 | 9 | 9 | 4% | 2 |
| A | 0.5% by weight PMMA (Covabead LH 70-3) | 2 | 7 | 12 | −3% | 3 |
| A | 1.0% by weight PMMA (Covabead LH 70-3) | 2 | 8 | 13 | 0% | 5 |
| A | 2.5% by weight PMMA (Covabead LH 70-3) | 2 | 5 | 11 | 0% | 8 |
| A | 5.0% by weight PMMA (Covabead LH 70-3) | 2 | 6 | 10 | 2% | 8 |
| A | 7.5% by weight PMMA (Covabead LH 70-3) | 1 | 5 | 10 | 2% | 10 |

The values set out in Table 1 show clearly that the inventive additives do not alter the release behaviour—as expressed through the release values for Tesa® 7475 and Tesa® 7476 and by the bond strength depression. At the same time the additives significantly improve the friction characteristics of the liners. An increase in fraction of PMMA additive leads, within the range under investigation, to improved friction characteristics.

Comparative Example 2

Silicone System with Non-Inventive Additives

Silicone system A is selected as in example 1, and the formulations were processed, coated and crosslinked as described in example 1.

CFA100 is a high molecular mass organopolysiloxane with a very low fraction of functional groups, and is manufactured by Wacker Chemie AG.

TABLE 2

Silicone system with non-inventive additives

| Silicone system | Additive | Rub-off | RV 7475 [cH/cm] | RV 7476 [cH/cm] | Bond strength depression [%] | Markability | Friction characteristics |
|---|---|---|---|---|---|---|---|
| A | none | 1 | 8 | 14 | −1% | 1 | 2 |
| A | 20% by weight CFA100 | 2 | 7 | 13 | 9% | 2 | 2 |

In the silicone system investigated, no significant improvement in the friction characteristics was ascertained as a result of the addition of CFA100. The release forces with both test tapes, Tesa® 7475 and Tesa® 7476, remained constant—albeit with an increase in the bond strength depression. Rub-off and markability show only slight differences.

Comparative Example 3

Silicone System with Non-Inventive Additives

Silicone system A is selected as in example 1.

Additions made to the silicone system were various silica particles, in the form of solid and hollow bodies, and the formulations were processed, coated onto glassine and crosslinked as described in example 1. MSS-500/3 are spherical silica particles from Kobo with a diameter (major diameter) of 3 μm. MSS-500/3H are surface-modified spherical silica particles from Kobo with a diameter of 3 μm (major diameter). Silica Shells are elliptical hollow silica beads from Kobo, having a diameter of 3 μm (major diameter), the minor diameter differing by 66% from the major diameter. Silica Shells SH are surface-modified elliptical hollow silica beads from Kobo with a diameter of 3 μm (major diameter).

TABLE 3

Silicone system with non-inventive additives

| Silicone System | Additive | Rub-off | RV 7475 [cH/cm] | RV 7476 [cH/cm] | Bond strength depression [%] | Markability | Friction characteristics |
|---|---|---|---|---|---|---|---|
| A | none | 1 | 8 | 14 | −1% | 1 | 2 |
| A | 5.0% by weight silica (MSS-500/3) | 3 | 24 | 10 | 9% | 7 | 7 |
| A | 5.0% by weight silica (MSS-500/3H) | 3 | 71 | 18 | 10% | 5 | 7 |
| A | 5.0% by weight silica (MSS-500/3H) | 1 | 6 | 8 | −1% | 3 | 4 |
| A | 5.0% by weight silica (Silica Shells) | 2 | 17 | 18 | 11% | 3 | 7 |
| A | 5.0% by weight silica (Silica Shells-SH) | 3 | 12 | 13 | 7% | 3 | 5 |

The addition of silica particles does lead in all cases to an improvement in the friction characteristics. In addition, the markability of the release systems is visibly improved by addition of silica particles. However, the release behaviour of the release systems with silica particles added is significantly impaired.

Example 4

Variation in Add-On Weight

Silicone system A is selected as in example 1. The silicone system was admixed in each case with 2.5% of PMMA spheres (Covabead LH 70/3 from Sensient, spherical PMMA beads with a particle diameter (major diameter) of 3 μm), and the formulations were processed, coated onto glassine and crosslinked as described in example 1.

The data given in table 4 shows that, with increasing add-on weight of the release layer, the friction characteristics become poorer and the release properties better. The release properties are in a good to very good order of magnitude throughout the range under investigation, whereas for each add-on weight the friction characteristics are significantly better than the standard without additives and with a silicone add-on weight of 1.5 g/m$^2$.

Example 5

Comparison of Different Additives

Silicone system A is selected as in example 1. The silicone system was admixed with the additives described in each case, and the formulations were processed, coated onto glassine paper (Silca ind. 2S white SCO 90 g from Ahlström) and crosslinked as described in example 1. Subsequently the anchorage of the release coating on the carrier was investigated in accordance with the above-described rub-off test. The silicone particles used were TOSPEARL120 from Momentive. The polyamide particles are spherical particles having an average diameter (major diameter) of 5 μm from Arkema Inc.

TABLE 4

Effect of add-on weight on release and friction properties

| Silicone system | Additive | Silicone add-on (g/m$^2$) | Rub-off | RV 7475 [cH/cm] | RV 7476 [cH/cm] | Bond strength depression [%] | Markability | Friction characteristics |
|---|---|---|---|---|---|---|---|---|
| A | 2.5% by weight PMMA (Covabead LH 70-3) | 1.17 | 1 | 7 | 20 | 1% | 2 | 9 |
| A | 2.5% by weight PMMA (Covabead LH 70-3) | 1.52 | 1 | 5 | 10 | −1% | 2 | 9 |
| A | 2.5% by weight PMMA (Covabead LH 70-3) | 2.15 | 2 | 3 | 7 | −1% | 2 | 9 |
| A | 2.5% by weight PMMA (Covabead LH 70-3) | 2.62 | 1 | 3 | 5 | 2% | 3 | 3 |

TABLE 5

Comparison of different additives

| Silicone system | Additive | Rub-off | RV 7475 [cH/cm] | RV 7476 [cH/cm] | Band strength depression [%] | Markability | Friction characteristics |
|---|---|---|---|---|---|---|---|
| A | none | 1 | 5 | 14 | −1% | 1 | 2 |
| A | 5.0% by weight PMMA (Covabead LH 70-3) | 2 | 6 | 10 | 2% | 3 | 8 |
| A | 5.0% by weight polyamide (Orgasol 2001 UD NAT 2) | 2 | 10 | 12 | 4% | 3 | 5 |
| A | 5.0% by weight silicone (TOSPEARL 120) | 3 | 7 | 12 | 4% | 2 | 6 |
| A | 20% by weight CFA100 | 2 | 7 | 13 | 9% | 2 | 2 |
| A | 5.0% by weight of silica (MSS-500/3) | 3 | 24 | 10 | 9% | 7 | 7 |
| A | 5.0% by weight silica (MSS-500/3H) | 3 | 71 | 19 | 10% | 6 | 7 |
| A | 5.0% by weight silica (MSS-500/3H) | 1 | 6 | 8 | −1% | 3 | 4 |
| A | 5.0% by weight silica (Silica Shells) | 2 | 17 | 15 | 11% | 3 | 7 |
| A | 5.0% by weight silica (Silica Shells-SH) | 3 | 12 | 13 | 7 | 3 | 5 |

The data set out in table 5 shows that the release layer with PMMA particles (Covabead LH 70/3 from Sensient, spherical PMMA beads having a particle diameter (major diameter) of 3 μm) exhibits good anchorage, very good release properties, a low bond strength depression and the best friction characteristics. No other additive combines such good values as the PMMA particles over the entire spectrum of the relevant properties.

Example 6

Influence of the Addition of Microparticles on the Bond Strength Depression

Polystyrene particles having a particle diameter of 1.3 μm (SX 130H from Soken) were added in different fractions to a solvent-containing, addition-crosslinking silicone system (SB 7458 from Dow Corning, hereinafter "silicone system C"). The obtained system was applied to a MOPP backing in a layer thickness of 0.4 g/m². Subsequently the system was crosslinked at 110° C. for 15 s in an oven.

The thus obtained release liners were bonded to 20 mm broad and 300 mm long stripes of the test adhesive tape Tesa® 7475. Per sample in each case 3 laminates of liner with test adhesive tape Tesa® 7475 were stored at pressure and temperature for 24 h. The temperature was 70° C. for the test adhesive tape Tesa® 7475. The pressure was 4 N/cm². After the subsequent storage of the samples for 2 h in a conditioned measuring room at 23° C. and 50% relative humidity the bond strength depression of the test adhesive tapes in comparison to new, uncovered adhesive tapes Tesa® 7475 was measured on a steel surface by means of a tensile test. The bond strength depression is calculated according to the following formula:

bond strength depression=[(bond strength of fresh tape−bond strength of tape covered with liner)/bond strength of fresh tape]*100%.

The experiment was repeated with smaller spheres of polymethyl methacrylate (0.6 μm diameter) on MOPP backing as well as on Glassine.

The influence of the microparticle addition on the bond strength depression of silicone release systems was subsequently carried out comparatively for solvent-free addition-crosslinking silicone systems. For this purpose, the silicone system A comprising PMMA-spheres (Covabead LH 70/3 from Sensient, PMMA-spheres having a particle diameter (main diameter) of 3 μm) was applied to a 75 μm strong PET film with a application weight of 1.5 g/m² and crosslinked for 30 s in an oven. The thus obtained release liners were applied to test adhesive tapes in the manner described hereinbefore, the laminates were stored as described and the bond strength depression was determined according to the method described hereinbefore. The results are contained in table 6.

TABLE 6

Influence of the microspheres on the bond strength depression

| Silicone system | Backing | Additive | Bond strength depression (%) | comparative/according to the invention |
|---|---|---|---|---|
| C | MOPP | no | 12.5 | comparative |
| C | MOPP | (SX 130H); 1 wt % | 6.4 | according to the invention |
| C | MOPP | (SX 130H); 2.5 wt % | −0.3 | according to the invention |
| C | MOPP | (SX 130H); 7.5 wt % | −0.9 | according to the invention |
| C | Glassine | no | 4.2 | comparative |
| C | Glassine | PMMA (MP 4009); 1 wt % | 2.5 | according to the invention |
| C | Glassine | PMMA (MP 4009); 2.5 wt % | 3.6 | according to the invention |
| C | Glassine | PMMA (MP 4009); 7.5 wt % | 6.1 | according to the invention |
| C | MOPP | no | 12.7 | comparative |
| C | MOPP | PMMA (MP 4009); 1 wt % | 6.4 | according to the invention |
| C | MOPP | PMMA (MP 4009); 2.5 wt % | −0.2 | according to the invention |
| C | MOPP | PMMA (MP 4009); 7.5 wt % | −1.1 | according to the invention |
| A | PET | no | −0.9 | comparative |
| A | PET | PMMA (Covabead LH 70/3); 1 wt % | 2.5 | according to the invention |
| A | PET | PMMA (Covabead LH 70/3); 2.5 wt % | 2.3 | according to the invention |
| A | PET | PMMA (Covabead LH 70/3); 7.5 wt % | 4.9 | according to the invention |

The results demonstrate that the bond strength depression of solvent-containing silicone release systems on backing films is lowered significantly at least on addition of up to 8 wt % of the finely particulate additives according to the invention. As becomes apparent from table 6, this effect can, however, not be transferred to other backings or solvent-free systems; in these cases no influence of the addition of microparticles on the bond strength depression is recognizable. The release properties of the release liners were influenced by the addition of microspheres in no example.

We claim:

1. A composition of a release coating comprising:
   a release agent; and
   0.01% by weight to 30% by weight, based on a total composition, of a finely particulate additive in a form of three-dimensional bodies based on polymers prepared from vinyl building blocks, wherein the three-dimensional bodies consist of solid material consisting of polymethyl methacrylate or mixtures of polymethyl methacrylate, wherein a minor length of a minor diameter of the three-dimensional bodies differs by not more than 20% from a major length of major diameter of the three-dimensional bodies.

2. The composition according to claim 1, wherein the three-dimensional bodies are ellipsoids.

3. The composition according to claim 1, wherein the major diameter of major axis of the three-dimensional bodies has the major length of 0.01 μm to 10 μm.

4. The composition according to at least one of claim 1, wherein a fraction of the finely particulate additive in the form of three-dimensional bodies is 0.1% to 10% by weight based on the total composition.

5. The composition according to claim 1, wherein the release agent is selected from the group of substances consisting of silicone, fluorinated silicone, fluorinated hydrocarbon, silicone copolymers, carbamate, waxes and mixtures of two or more of the substances thereof.

6. The composition according to claim 1, wherein the release agent comprises solvent-containing and/or solvent-free systems.

7. The composition according to claim 1, wherein the release agent is capable of radiation-crosslinking, condensation-crosslinking or addition-crosslinking.

8. The composition according to claim 1, wherein the major diameter of the major axis of the three-dimensional bodies has the major length of 1 μm to 4 μm, and/or the minor length of the minor diameter of the minor axis of the three-dimensional bodies differs by not more than 10% from the major length of the major diameter.

9. The composition according to claim 1, wherein a fraction of the additive in the form of three-dimensional bodies is 0.3% to 5% by weight based on the total composition.

10. The composition according to claim 1, wherein the release agent comprises solvent-free systems.

11. The composition according to claim 1, wherein the release agent is capable of addition-crosslinking.

12. A method for furnishing a release liner, the method comprising:
    providing the release liner having at least one layer on the release liner, wherein the at least one layer comprises the composition according to claim 1.

13. The method according to claim 12, wherein the at least one layer has a layer thickness of 0.1 to 5.0 μm.

14. The method according to claim 12, wherein the release liner is a single-sided adhesive tape lined on one side with the composition according to claim 1 or a double-sided adhesive tape lined on both sides with the composition according to claim 1.

15. The method according to claim 12, wherein the at least one layer has a layer thickness of 0.4 to 2.0 μm.

16. A release liner comprising a backing film and a solvent-containing release coating, wherein the backing film is selected from the group consisting of biaxially oriented polyethylene terephalate, polybutene, polypropylene, polyethylene, monoaxially oriented polypropylene, biaxially oriented polypropylene and polyethylene, wherein the solvent-containing release coating comprises:
    a release agent; and
    1 to 8 wt %, based on a total weight of the solvent-containing release coating, of a finely particulate additive in a form of three-dimensional bodies based on polymers prepared from vinyl building blocks, wherein the three-dimensional bodies consist of solid material consisting of polymethyl methacrylate or mixtures of polymethyl methacrylate, wherein a minor length of a minor diameter of the three-dimensional bodies differs by not more than 20% from a major length of a major diameter of the three-dimensional bodies.

* * * * *